United States Patent [19]

Undin et al.

[11] Patent Number: 4,766,672
[45] Date of Patent: Aug. 30, 1988

[54] STRIPPING TOOL

[75] Inventors: Hans Undin, Akersberga; Hans Wiener, Täby, both of Sweden

[73] Assignee: C. A. Weidmuller GmbH & Co., Detmold, Fed. Rep. of Germany

[21] Appl. No.: 875,098

[22] Filed: Jun. 17, 1986

[30] Foreign Application Priority Data

Jun. 17, 1985 [SE] Sweden ................... 8502980

[51] Int. Cl.⁴ .................. B21F 13/00; B26B 27/00
[52] U.S. Cl. .................... 30/90.1; 29/564.4; 81/9.4
[58] Field of Search ............ 30/90.1, 91.2; 81/9.4, 81/9.41; 29/564.4

[56] References Cited

U.S. PATENT DOCUMENTS 4,104,791  8/1978  Sunahara ..................... 30/90.1
4,130,031 12/1978  Wiener et al. ............... 30/91.2 X

FOREIGN PATENT DOCUMENTS 7302817  8/1974  France .
 670829  4/1952  United Kingdom ........... 30/90.1

Primary Examiner—Douglas D. Watts
Attorney, Agent, or Firm—Cushman, Darby & Cushman

[57] ABSTRACT

A stripping tool of a kind where first a local incision is made in the insulation layer or layers of an electrical conductor and then is extended along the entire cross-sectional periphery by relative rotation of the tool and of the conductor, is provided with a slider in a housing or tool body, which slider may be activated by an eccentric cam member so as to press the conductor against a cutting means. The cam member may be embodied by an annulus mounted on a bearing which has a central opening through which the user may slip on one finger of his hand in order to execute said rotation, and the cutting means may be defined by an exchangeable cassette provided with cutting blades settable by setting screws.

20 Claims, 3 Drawing Sheets

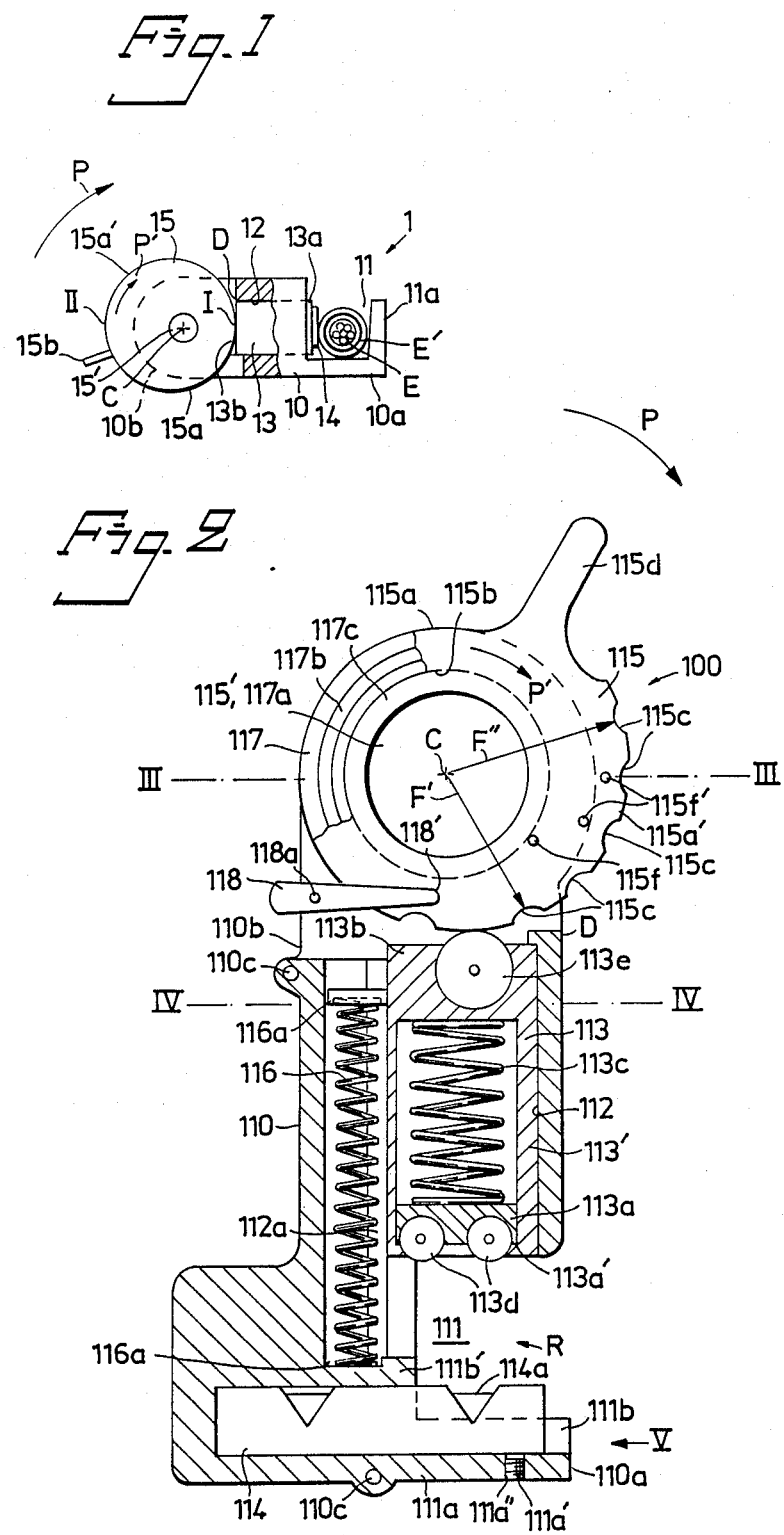

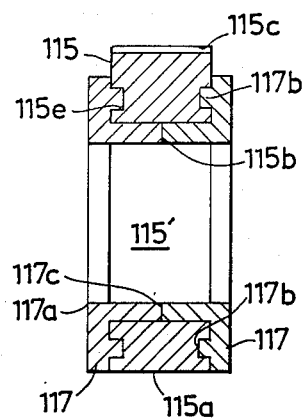
Fig. 3
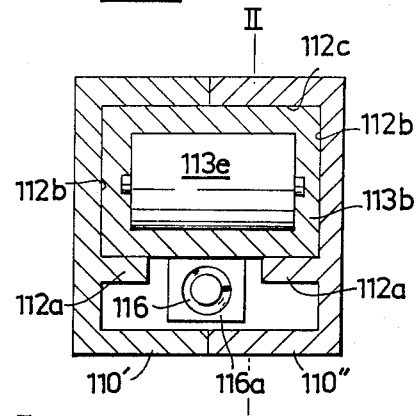
Fig. 4
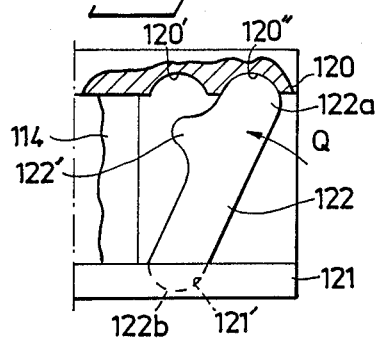
Fig. 5
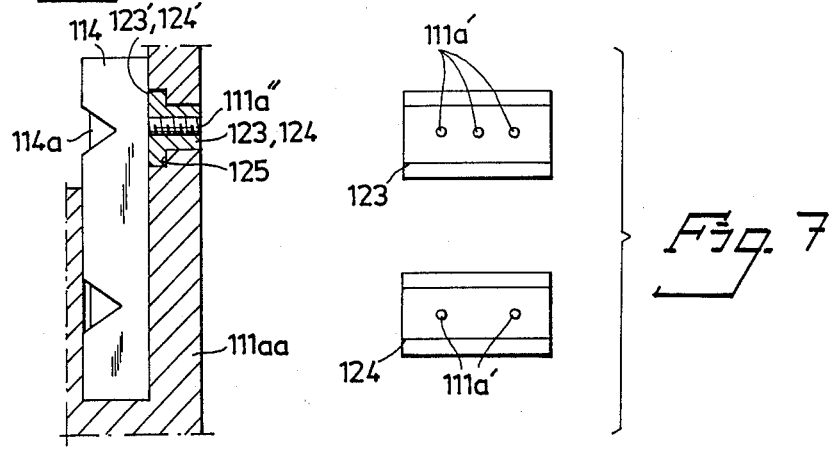
Fig. 6
Fig. 7

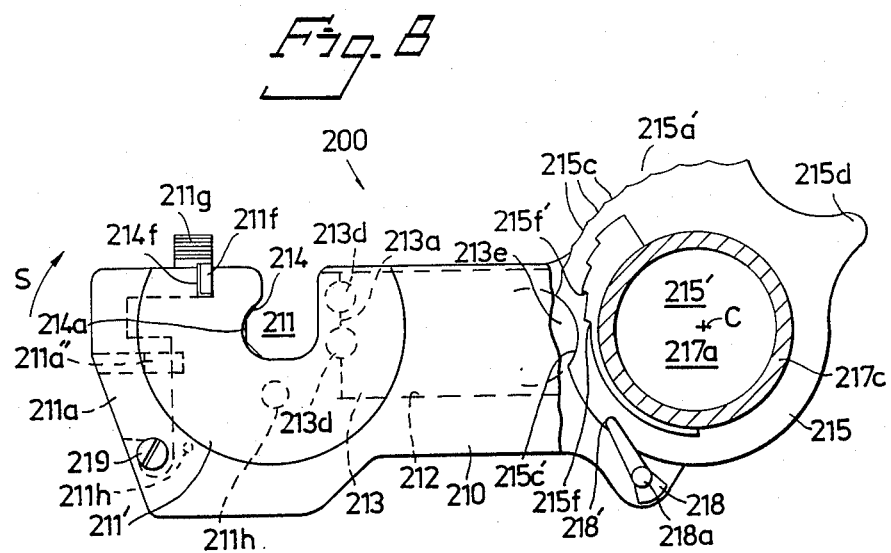
Fig. 8
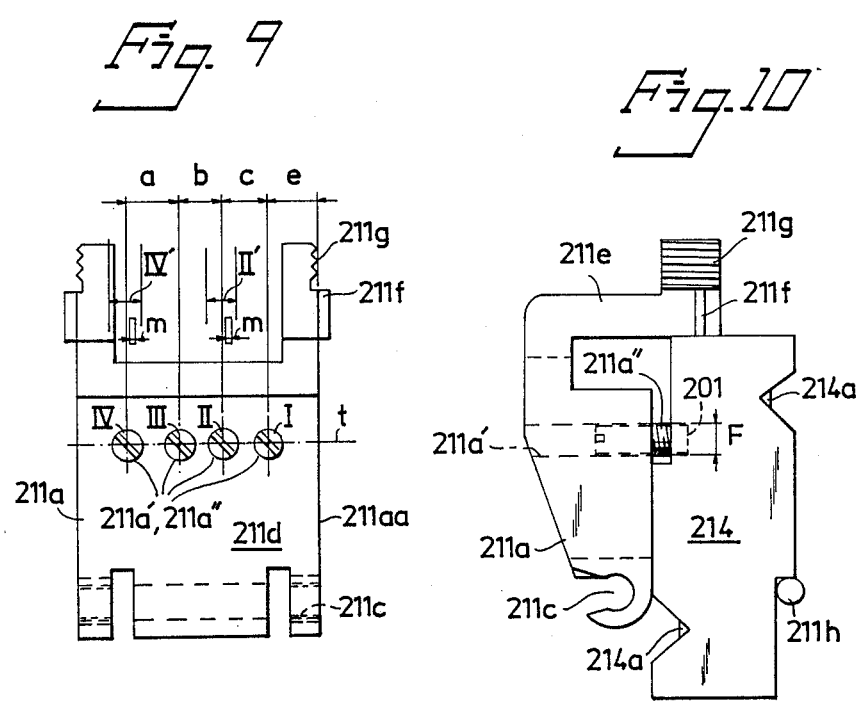
Fig. 9
Fig. 10

STRIPPING TOOL

FIELD OF THE INVENTION

The present invention refers to a stripping tool for electrical conductors with circular cross-section and which are covered with at least one layer of insulation. The tool comprises a housing in which at least one cutting means having at least one cutting blade is accommodated, and a means for pressing an inserted conductor against said cutting means so that when the housing is rotated relative to the inserted conductor an initially only local incision made by the cutting means into the insulation layer or layers is extended along the entire cross-sectional periphery thereof. Stripping tools of this kind are mostly used for treating coaxial cables which need more than one incision in their insulating layers.

BACKGROUND OF THE INVENTION

A tool of this kind is described e.g. in the U.S. Pat. No. 4,130,031 of the inventors. The housing of this known tool is defined by a first jaw means in which a support for the treated conductor, defined by a V-spaped recess into which one or more knife blades of a cutting means project is provided intermediate the two ends of the jaw means. At one said end is to the first jaw means pivoted a second jaw means defining a pushing means by which an inserted conductor can be pressed against the cutting means. At the other said end is a means for locking both jaws means in their closed position provided, viz. a protruding finger which can hold the second jaw means and which is integrated with a gripping means defined by an eye through which the user can put his finger in order to twirl the tool about the inserted conductor, and so to extend the only local incision or incisions along the entire cross-sectional periphery of the conductor. However, the said manner of forcing the cutting means into the insulation and of locking the two jaw means may sometimes be difficult to carry out, particularly with hard and/or encrusted insulation layers.

OBJECTS OF THE INVENTION

It is the principal object of the invention to provide an improved stripping tool of the kind aforesaid which obviates the disadvantages of hitherto-known tools, including the drawback mentioned above. Another object is to provide an improved stripping tool with a rectilinear approaching movement of a pusher means toward the treated conductor. Yet a further object of the invention is to provide an improved cutting means for stripping tools embodied by a cassette with one or more settable cutting blades.

SUMMARY OF THE INVENTION

These objects and others which will become apparent hereinafter are attained with a stripping tool of the kind aforesaid which according to the invention comprises in combination: chamber located at one end of a housing for receiving a treated conductor, and which is toward the outside limited by a first or outer side limitation means which is rigidly connected with the rest of the housing; a rotational bearing for an eccentric cam member located at the opposite end of the housing and having a rotational axis extending parallel with the longitudinal direction of a conductor inserted in said chamber; a passageway in the form of a rectilinear track extending in the housing at right angles to said conductor and to said axis between said chamber and said mounting; a slider sliding frame translatorily mounted in said track and having a first end adjacent said mounting, and a second end adjacent said chamber and defining a second or inward side limitation means of said chamber and which can be moved into said chamber; and a cam member, operable by the user and rotarily mounted in said bearing and having an eccentric engagement portion which extends at a gradually increasing distance from said axis and which bears against said first end; said cutting means being mounted, at least on one of the said first and second side limitation means so as to face said chamber.

According to another feature of the invention, the cutting means may be defined by a set of at least two elongated cutting blades, each settable by a separate setting screw, which set is interchangeable with at least one other set of at least two elongated cutting blades, each settable by a setting screw of its own, and of which at least one is disposed at a location not co-inciding with that of the corresponding cutting blade in the first set. The setting screws may then, in order that each cutting blade always be served by a fully operatively placed setting screw, be mounted in an insert which is separate from the housing and which is, at the same time as the respective set of cutting blades, interchangeable with another insert with differently located setting screws. The sets of cutting blades are in this case embodied by the said knife cassettes.

Alternatively, in order that each cutting blade always be served by an operatively located setting screw without the need of changing the locations of the setting screws relative to the housing, at least some of the setting screws are arranged at locations where cutting blades from at least two said sets which, when superimposed one upon the other would lie closest one to another, lie within an area covered by a front face of the setting screw. In this case, the sets of cutting blades may or may not be embodied by a knife cassette.

The tool and the blade setting arrangement according to the present invention are particularly suited for stripping coaxial cables.

BRIEF DESCRIPTION OF THE DRAWINGS

In order that the invention may be more readily understood, and so that further features thereof may be apparent, specific embodiments thereof will now be described by way of example and with reference to the accompanying drawings in which:

FIG. 1 is a diagrammatic side-elevational view, partly in section, of a first embodiment of a stripping tool according to the present invention;

FIG. 2 is a diagrammatic sectional view, at a larger scale than FIG. 1, of a second embodiment of a stripping tool according to the present invention;

FIG. 3 is a diagrammatic cross-section through the tool of FIG. 2 along the plane III—III;

FIG. 4 is a diagrammatic cross-section through the tool of FIG. 2 along the plane IV—IV;

FIG. 5 is a plan view of a fixing means in the tool of FIG. 2;

FIG. 6 shows in a diagrammatic, longitudinal section an alternative arrangement of the setting screws in the tool of FIG. 2;

FIG. 7 is a plan view of two different inserts according to FIG. 6;

FIG. 8 is a diagramatic side-elevational view, partly in section, of third embodiment of the tool according to the present invention;

FIG. 9 is a diagrammatic front view of a cassette holder of the tool according to FIG. 8; and FIG. 10 is a diagrammatic side-elevational view of the holder of FIG. 9 with a cassette inserted.

According to FIG. 1, a stripping tool 1 has an elongate tool body or housing 10, at one end 10a whereof a chamber 11 for the reception of a treated conductor E is provided. The chamber 11 has the shape of a trough which is toward the outside, i.e. at the very end of the housing 10, limited by a rigid side wall 11a which is rigidly connected with the rest of the housing 10 and which defines a fixed first or outer side limitation of the chamber 11. This outer side limitation is fixed i.e. unmovable. On the opposite, forked-shaped end 13b of the housing 13 is an axle stub 15' mounted which defines a rotational bearing of an eccentric cam member 15 having a rotational axis c. A rectilinear track 12 extends in the housing 10 at right angles to the direction of a conductor E inserted into the chamber 11 and to the direction of the rotational axis C between the chamber 11 and the bearing 15'. A block 13, defining a slider, is translatorily mounted in the track 12. The slider 13 has an end 13a adjacent the chamber 11 and defining a second or inner side limitation of the chamber 11. This inner side limitation is movable. A cutting means embodied by a single cutting blade 14 is mounted at said end 13a, e.g. in a slot in the slider 13.

The cam member is embodied by an eccentric, circular disc 15 which is rotarily mounted on the axle stub 15', at the forked end 13b of the housing 13, so that the longitudinal axis of the axle stub 15' defines the said rotational axis c of the cam member 15 and of the rotational bearing, and which extends at right angles relative to the track 12 and parallel with a conductor E inserted in the chamber 11. The disc 15 has a periphery 15a which is eccentric relative to the axle tap 15' and which bears against the other end 13b of said slider 13. The slider 13 is shown in the drawing in its most retracted position which is the rest position thereof and in which the eccentric disc 15 occupies its first extreme rotational position bearing against the slider 13 at a location I on the periphery 15a. Said location lies closest to the rotational axis c.

When the eccentric disc 15 is rotated through 180° by the user, e.g. by being affected in arbitrary direction on the periphery 15a (possibly made glide-proof), the slider 13 is positively approached to the chamber 11 and the cutting blade 14 is forced to penetrate into the insulation layer E' of the conductor E to an extent which is predetermined by the length of the stroke of the slider 13, which in its turn is defined by the eccentricity of the cam member 15.

When the eccentric disc 15 reaches its second extreme rotational position, which is its final rotational position, it bears against the slider 13 at the location II, i. e. the location on the periphery 15a which is most remote from the rotational axis C. In this position the disc 15 is self-retained and thereby also the slider 13 is retained in this operative position thereof.

The portion of the periphery 15a of the cam means 15 between the locations I and II, which upon rotation glides past the slider 13 and affects it, defines an engagement portion of the periphery 15a. The distance of this engagement portion to the rotational axis C (axle stub 15') of the eccentric disc 15 gradually increases. The rest of the periphery 15a may be considered to embody a portion where a driving force may be applied (finger of the operator).

Alternatively, a projecting stop pin 15b may be arranged on the periphery 15a of the disc 15. Then only the upper half of the periphery 15a between the locations I and II in FIG. 1 defines the engagement portion 15a', because the disc can be rotated only clock-wise in the sense of arrow P' until the pin 15b at D hits the housing 10. The pin 15b is located such that upon this impact the disc 15 is in its second extreme rotational position (the rotational end position), or a little bit beyond it.

By selecting the "gradient" of the engagement portion 15a' (how steeply its spacement from the rotational axis C increases), a very decisive parameter governing how smoothly the cutting means 14 will penetrate into the insulation E' may be established already at the projecting stage.

When the user has rotated the disc 15 into the said rotational end position, he holds firmly the conductor E with one hand and rotates the whole housing 10 at least one full turn about the conductor, whereby an incision, made by the cutting means and which originally was only local, is extended along the whole cross-sectional periphery of the insulation E'.

It will be understood that a cutting blade also may be arranged on the side wall 11a, and as well in addition to, as instead of the cutting blade 14 on the slider 13, and further that on both locations instead of a single cutting blade also a cutting means comprising a plurality of cutting blades can be provided. It will be further appreciated that the chamber 11 can be also closed on the side which in FIG. 1 is the upper side, enabling an insertion of the conductor E only in longitudinal direction (and not also transversely to this direction).

A second embodiment 100 of the tool of the invention, illustrated in FIGS. 2 to 4 and where all parts corresponding to those shown in FIG. 1 are designated by reference numerals increased with 100 relative to FIG. 1, has an elongated tool body or housing 110. At one end 110a of the housing 110 is a trough-shaped chamber 111 for reception of an insulated conductor (not shown), which has to be treated, provided. At the fork-shaped opposite end 110b of the housing 110 is a rotational bearing 117c with a rotational axis C arranged, the construction of which will be described more in detail farther on. In a rectilinear track 112, extending in the housing 110 at right angles to the rotational axis C and to the longitudinal direction of a conductor inserted in the chamber 111, is a slider 113 translatorily mounted.

The chamber 111 is limited toward the outside by a side wall 111a which is rigidly connected with the rest of the housing 110, and which also defines the limitation of a space 111b for the accommodation of a cutting means embodied by an exchangeable knife cassette 114 comprising one or more cutting blades 114a. Such cassettes, which lie outside the scope of the present invention, are already known and described e.g. in the already mentioned U.S. Pat. No. 4,130,031. The space 111b, limited by the side wall 111A and with an inserted cassette 114 defines an outer side limitation means of the chamber 111.

In the exemplary embodiment of FIG. 2, the slider 113 is defined by a hollow body 113' in which at the end adjacent the chamber 111 a movable block 113a, bearing two freely rotatable rollers 113d is glidably mounted. The block 113a with the rollers 113d defines an inner limitation means of the chamber 111. At the opposite end of the body 113', a fixed block 113b carries rotatorily a single roller 113e having a somewhat larger diameter than the rollers 113d. A first compression spring 113c having a predetermined compressive force is mounted between the two said blocks 113a and 113b to push them apart. A stop 113a' prevents the movable block 113a to be pushed out of the hollow body 113'.

The force of the spring 113c can also be varied or set i.e. by replacing the spring and/or the block 113a by analogical members with other parameters, or by anchoring one end of the spring 113c on a setting screw so that the length, i.e. the degree of compression of the spring 113c in its initial position, may be altered. Moreover, an elastomeric member such as a block of rubber etc. may be used instead of the spring 113c.

The track 112 comprises two lower lateral rails 112a, two lateral guide faces 112b (FIG. 4) and possibly a top face 112c.

The entire slider 113 is continuously pressed away from the chamber 111 and against the cam member 115 by a second spring 116 which in general is weaker than the spring 13c and which at one end is anchored in a recess 116a in an inner wall 111b' delimiting the chamber 111, and at the other end on a support 116a projecting from the slider 113. Thus, the slider 113 as a whole is movable in the housing 110 against the force of the spring 116, and the distance between the blocks 113a and 113b may be reduced against the force of the spring 113c.

The cam member 115 consists of an annular disc having a central opening 115' limited by a circular inner periphery 115b. An outer periphery 115a of the disc 115 comprises an engagement portion 115a' which is eccentric relative to the rotational axis C which passes through the center of the said circular inner periphery 115b. By the term "eccentric" is in the present description and in the accompanying claims understood a gradually increasing distance—"gradient"—of the engagement portion of the cam member from the rotational axis of the cam member, however without limitation to an exactly circular shape.

The engagement portion 115a' is provided with a plurality of shallow recesses 115c for receiving the roller 113e which defines an engagement means of the slider 113, and which by the action of the spring 116 is pressed into an adjacent recess 115c. As the recesses 115c are arranged along a path whose spacement from the rotational axis C continually increases, against the sense of rotation of the disc 115 (arrow P), the distance F" is greater than the distance F'. The engagement portion 115a' is at the end thereof which is most remote from the rotational axis C terminated by a finger-shaped projection 115d.

The central opening 115' is so large as to enable the cam member 115 to be mounted on the rotational bearing 117 described in detail bellow and which comprises annular projections 117c (FIG. 3) to be introduced into the opening 115'.

The fork-shaped end 110b of the housing 110 is somewhat narrower than the rest of the housing 10 (compare FIGS. 3 and 4) and terminates in two annular ears 117, each of which has a central opening 117a sufficiently large to enable the user to put a finger therethrough. On the periphery 117' of the openings 117a are the above said inwardly extending annular projections 117c provided which preferably may be so broad as to touch one the other, as shown in FIG. 3, and which define a rotational bearing of the cam member 115. Instead, or in addition to the annular projection 117c, an annular projection 117b, also centered on the rotational axis C, may be arranged on the inner face of each ear 117 intermediately both the peripheries thereof. Corresponding annular grooves 115e for the accommodation of the projections 117b are provided on the lateral faces of the cam member 115. It will be understood that instead of the annular projections 117c and/or 117b, also only isolated projecting bearing pins, e.g. three such pins at 120° spacements, can be provided.

The tool 100 is further equiped with a stop device to the purpose of preventing that a certain preferred rotational end position of the cam member 115 be transgressed. The purpose of such a device is to guarantee that a once established optimum advance distance of the slider 113 is exactly duplicated e.g. upon repeated stripping of a plurality of identical conductors.

On one side face of the cam member 115 is a first stop means 115f arranged which is associated with an adjacent recess 115c and defined by a short pin located as close to the rotational axis C as possible. Similarily stop means, i.e. pins 115f', are also associated with the two recesses 115c which follow in reverse direction of rotation P Each of the pins 115f' following after the pin 115f' is a bit more removed from the rotational axis C than the predeceding pin. In the housing 110 is a lever 118 pivoted, whose one end 118' may be brought in a position of collision with a selected stop pin 115f or 115f' by rotating the lever 118 to a suitable extent about its pivot tap 118a. With the aid of means known as such and not shown in the drawing, e.g. a resilient washer mounted on the pivot tap 118a, the setting movement of the lever 118 may be made so tough that an outer setting force is needed to reset the lever. The lever 118 is in the drawing shown in a position where the cam member 115 will be stopped by a collision of the first stop pin 115 with the end 118' of the lever 118.

In the drawing FIG. 2 is shown that the stop pins 115f, 115f' are located adjacent the associated recesses 115c. This, however, is no—general rule, because the location of the of these pins or other stop means depends on the length and location of the lever 118.

This lever 118 may be shorter or longer than shown, or it may be e.g. mounted in the housing 110 for a translatory movement parallel with the direction of the track 112. The only decisive fact is obviously that its end 118a may be brought to differently spaced positions relative the axis C. A recess 115c is therefore "associated" to a stop means (or vice versa) when the stop means will be hit by the end 118' of the lever 118 at the moment when the respective recess 115c occupies its position of engagement with the roller 113e.

In FIG. 5, which is a view in the sense of arrow V in FIG. 2, is shown a simple affixing device for the knife cassette 114 in a cassette holder 111b. At the upper end of a space 111b, defining the cassette holder, and closely adjacent the end of a cassette 114 inserted therein, are two rectilinear grooves 120, 121 provided which extend parallel with the drawing plane. A preferably arcuate recess 121' extends laterally (i.e. also parallel to the drawing plane) from the groove 121, and two such recesses, a recess 120' closer to the cassette 114, and a recess 120" more remote from the cassette 114, are arranged in the groove 120. In two opposite recesses, 120" and 121', is a tie 122, e.g. of plastic, inserted whose ends 122a and 122b have a periphery corresponding to the shape of the said recesses, i.e. preferably arcuate.

The tie 122 has further a projection 122' extending toward the cassette 114. When the tie 122 is readjusted (arrow Q) by the end 122a being transferred into the recess 120', the projection 122' will lock the cassette 114 on its place. Such a readjustment can be readily effected due to the said arcuate shape of the recesses and of the tie ends, and also due to a certain elasticity of the tie. For removing the cassette 114, the tie is set back into the recess 120".

Setting screws 111a" for affecting the individual cutting blades 114a in the cassette 114 are screwed into tapped holes 111a' provided in the lateral wall 111a (FIG. 2). In FIGS. 6 and 7 is shown an improved arrangement of said tapped holes. It is known that the exchangeable cassettes 114 may comprise a various number of cutting blades, e.g. two or three, and at different i.e. not co-inciding locations relative the housing 110 when the cassettes are inserted. In order that the setting screws 111a" always come to lie exactly opposite the blades to be adjusted, the said holes 111a' are not arranged directly in the side wall 111a, as is shown in FIG. 2, but in an exchangeable insert such as 123 or 124 which in its turn may be mounted for ready exchange in the side wall 111a.

All inserts 123, 124 have the same peripheric circumferential shape and the same cross-sectional shape, wider at the end adjacent the cassette 114 than at the opposite end. Thus, different inserts may be mounted in corresponding (i.e. having the same circumferential and cross-sectional shape) recesses 125 in the side wall 111aa (which possibly may be made somewhat thicker than the side wall 111a). In the example shown, the said cross-sectional shape is a T-shape, but it may also be e.g. a trapezoid. As the insert and the recess are wider adjacently the cassette 114, the insert is automatically locked in the recess 125 in the side wall 111aa when the cassette 114 is inserted into the space 111b, and can be removed from from the recess 125 when the cassette 114 is removed from the space 111b and then possibly separated from the cassette.

The housing 110 is preferably built up of two substantially symmetrical halves 110' and 110" (FIG. 4) mounted together with the aid of screws, bolts etc. Upon assembly, the slider 113 is first assembled and then inserted in one housing half, followed by the spring 116 and the cam member 115, whereupon the other housing half is added and fixed.

The tool operates as follows:

The projection 115d is rotated against the sense of arrow P into the position shown in FIG. 2 or perhaps a bit farther, and the conductor to be stripped is inserted into the chamber 111. As this chamber 111 has the shape of a trough which is limited by the two side limitation means 114 and 113a, but is open upwardly (as viewed in FIG. 2), the conductor may be inserted in the sense of arrow R transversely to its longitudinal extension which can be more advantageous than an also possible insertion in longitudinal direction. Thereupon, the projection 115d is rotated clock-wise in the sense of arrow P' till the projection 115d at D strikes the housing 110, the roller 113e bouncing from one recess 115c into the next against the force of the spring 116. Due to the eccentricity of the engagement portion 115a' of the cam member 115, the entire slider 113 is thereby approached to the inserted conductor, and at the same time the movable block 115a is pressed into the hollow body of the slider 113 against the force of the spring.

As the roller 113e enters each of the recesses 115c which are more spaced from the rotational axis C than the preceding one, a selectable and lockable end rotational position of the cam member 115 is reached in which the slider 113 occupies a locked translatorial end position in which the two rollers 113d with predetermined force (of the spring 113c) affect the inserted conductor and press it against the cutting means 114. Said cutting means penetrates into the insulation layer of the conductor, performing one or more local incisions therein, depending on the number of individual cutting blades.

The user puts thereafter one finger of his hand through the openings 117a in the ears 117 and through the aligned opening 115' in the cam member 115, and rotates the whole tool 100 one or several times about the inserted conductor (which he firmly holds by the other hand), thereby extending each local incision on the entire periphery (circumference) of the conductor. It will be noted that the depth of the incision or incisions is by no means affected in this process, because the rotational position of the cam means 115 is not changed (due, among other things, to the fact that the annular projections 117c completely separate this member from the finger passing through the opening 115').

In FIGS. 8 to 10 is shown a third embodiment 200 of the tool of the invention. All parts corresponding to those in FIG. 2 are designated with reference numerals increased with 100 relative to FIG. 2. The tool 200 has, according to FIG. 8, an elongated tool body housing 210 with a trough-shaped reception chamber 211 for a treated conductor (not shown) at one end, and with a rotational bearing at the other, fork-shaped end. Between said chamber 211 and said bearing extends a rectilinear track 212. In analogy to the tool 100 of FIG. 2, said rotational bearing comprises annular projections 217c extending inwardly from the inner sides of two ears 217 embodying said fork-shaped end of the housing 210. The projections 217c define the periphery of circular openings 217a in the ears 217. An eccentric cam member 215, which is provided with a driving projection 215d, is with its own circular central opening 215' rotarily mounted on said projections 217c.

The cam member 215 is along its engagement portion 215a' provided with a plurality of shallow recesses 215c for a roller 213e mounted on a slider 213 which in its turn is translatorily mounted i a rectilinear track 212. The first of these recesses, defining the most retracted position of the slider 213, is, as seen in the drawing FIG. 8, a deeper recess than the rest of the recesses 215c. The slider 213 may be constructed in the same way as the slider 113 of FIG. 2, or also as a single integral element (i.e. without the moving block and the inner spring) bearing the roller 213e and possibly, on the opposite end 213a, two rollers 213d. It will be however readily understood that the end portion 213a of the slider 213 which engages a conductor inserted in the chamber 211 may also be constructed in a different way, e.g. as a V-shaped recess or the like.

The tool 200 is operated in analogical manner as the tools 10 and 100. On one side flank (the one which is visible in FIG. 8) of the tool body 210 is a somewhat protruding, highly polished circular surface 211' provided around the chamber 211 in order to facilate rotation of the tool 200 about the conductor inserted in the chamber 212 by reducing friction between the hand of the user holding the conductor and the housing 210. The surface 211' defines at the same time a marking showing on which side of the tool the treated cable shall extend with its entire length. This distinction is relevant if the cutting blades in the cutting means 214 are not located symmetrically relative the sagittal (median) plane of the tool.

The exchangeable knife cassette 214 (FIG. 10) is accommodated in a cassette holder 211a (FIG. 9) which in its turn is in a readily insertable and removable manner mounted in the tool body or housing 210, and which together with the inserted cassette 214 defines an outer limitation means of the chamber 211. The cassette holder 211a is with the aid of two partially open loops 211c rotarily mounted on a mounting bolt 219 provided in the housing 210. The holder 211 can be rotated in the sense of arrow S about said bolt untill two side projections 211f thereon, located on the ends of resilient extensions 211e, enter recesses 214f provided to this purpose in the side walls of the housing 210. A cassette 214 inserted in the cassette holder 211a is in this end position retained by a stop member 211h such as tap or the like provided in the housing 210 spacedly from the bolt 215. Consequently, there is no need for an extra fixing means such as the tie 122 of FIG. 5, because the cassette holder 211a itself takes over the locking function together with the stop means 211h. In the cassette holder 211a are setting screws 211a'' for the cutting blades 214a of the cassette 214 provided.

For removing the cassette 214 from the holder 211a and/or this holder from the tool body 210, the two side projections 211f are liberated from the recesses 214f by compressing two grips 211g, and the holder 211a is rotated against the sense of arrow S. The cassette may be replaced by another one, or the holder 211a may be totally separated from the tool body 210 by hooking out the loops 211c, and also replaced by a cassette holder accommodating a cassette with differently located cutting blades and having itself correspondinglu located setting screws.

According to one embodiment of the present invention, an exchange of the cassette holder is, however, in most cases not necessary, even if cassettes with a different number of differently located cutting blades are to be used.

According to FIGS. 9 and 10, showing such a cassette holder at a larger scale with (FIG. 10) and without (FIG. 9) an inserted cassette 214 (FIG. 10 showing for clarity also the stop means 211h provided in the tool body 210), four tapped holes 211a' for four setting screws 211a'' or I–IV respectively are arranged in a wall 211d of the holder 211a. The holes 211a' are located at spacements a, b, c one from another and at a spacement e from that side 211aa of the holder 211a which is adjacent the flank of the housing 219 where the circular surface 211' (or some other mark indicating how the conductor correctly shall be placed in the chamber 211) is provided.

The spacements a to c are selected such that the setting screws I to IV, screwed-in in the holes 211a'', and having a front face 201 with a diameter F, can affect all cutting blades 214a in cassettes with two as well as with three cutting blades (and, of course, also in those with one single cutting blade)

The following values may be mentioned as an example:

Diameter F: 3,5 mm Spacement b: 3,7 mm Spacement e: 4,0 mm Spacement a 4,5 mm Spacement c 3,8 mm Thickness m of the blades 214a: 0,4 mm The spacements between the individual cutting blades 214a in the different cassettes 214 correspond to the various stripping tasks which shall be performed. The following cassettes have been considered:

TABLE 1

| | |
|---|---|
| (A) A one-blade cassette | |
| (B) A two-blades cassette with a spacement between the cutting edges of the blades | 4,2 mm |
| (C) A two-blades cassette with a spacement between the cutting edges of the blades | 6,0 mm |
| (D) A two-blades cassette with a spacement between the cutting edges of the blades | 12,0 mm |
| (E) A three-blades cassette with a spacement between the cutting edges | 3,0 mm and 8,0 mm |
| (F) A three-blades cassette with spacements between the cutting edges of the blades | 4,0 mm and 7,5 mm |

A first cutting blade 214a is in all cassettes mounted at the same location relative the setting screw I and the following table shows which setting screws affect in which cassette all the cutting blades thereof:

TABLE 2

| Setting screws: | I | II | III | IV |
|---|---|---|---|---|
| Cassette A | x | x | | |
| Cassette B | x | | x | |
| Cassette C | x | | | |
| Cassette D | x | | | x |
| Cassette E | x | x | | x |
| Cassette F | x | x | | x |

It will be appreciated that each cutting blade in the interchangeable cassettes 214 of various types may be affected only by one single setting screw 211a', and this is achived according to the invention by at least some of the setting screws 211a' (the screws I, II, IV in the present example) being arranged at such locations in the cassette holder 211a where cutting blades 214a of at least two different cassettes 214 inserted in the cassette holder at least partially lie within the area of front face 201 of the setting screw having a diameter F (cfr. the number of x-markings in the columns I, II and IV in table 2).

Consequently, in most cases it is not necessary to change also the cassette holder when the cassette is changed, and the loops 211c may be entirely closed, as there is no longer any need for the holder to be readily removable. It will be appreciated that the arrangement of the setting screws 211a'' just described is not limited to the specific cassette holder 211a, but may also be applied in connection with any other cassette holder, e.g. according to FIG. 2, or a cassette holder according to the cited U.S. Pat. No. 4,130,031.

The diameter F of the front face 201 of the setting screws affecting cutting blades which in the various cassettes do not lie on exactly co-inciding locations relative the cassette holder should preferably be five to ten times larger than the thickness m of the cutting blades. In FIG. 9 are shown areas II' and IV' within which at least a part of the thickness m of all respective cutting blades 214a must lie. However, the setting screw I, and, in the present example, also the setting screw III, may have a smaller diameter, because in all cassettes the blades served by screw I may be identically located relative the cassette holder, and because the setting screw III serves (in the present example) only one blade (se Table 2). However, out of practical production reasons, all setting screws 211a' generally will be made identical.

All setting screws 211a" are preferably located along one single row or line t extending at right angles to the direction of the cutting blades, because only then a given rotation of any setting screw results in an identical setting movement of any cutting blade (provided all screws have equal thread pitch).

We claim:

1. A stripping tool for electrical conductors having substantially circular cross-sections which are covered with at least one layer of insulation, comprising:
   a housing in which is accommodated a first set of two settable elongated cutting blades, which first set is interchangeable with a second set of two settable elongated cutting blades, said second set having at least one cutting blade disposed at a spacing location in said second set not coinciding with the spacing location of the corresponding cutting blade in the first set;
   means for accommodating an electrical conductor;
   means for pressing said conductor against said cutting blades so that when the housing is rotated relative to the inserted conductor, local incisions made by said cutting blades are extended around the entire cross-sectional periphery of the conductor,
   each cutting blade being served by at least one of a plurality of operatively located setting screws wherein at least some of the setting screws are arranged at locations where cutting blades from at least two sets of cutting blades lie within an area covered by a front face of the setting screw.

2. A stripping tool as in claim 1, wherein:
   the diameter of the said front end area is at least five times as large as the thickness of said blades.

3. A stripping tool as in claim 1, wherein:
   all of said setting screws are arranged in one single row at right angles to the direction of the cutting blades.

4. A stripping tool as in claim 1, wherein:
   in all sets of cutting blades, a first cutting blade is disposed at the same location relative to a first setting screw.

5. A stripping tool for stripping sheathing from electrical conductors having substantially circular cross sections, said tool comprising:
   a housing member having first and second ends and a longitudinal passageway located therein extending between said first and second ends;
   a sliding frame mounted in said passageway for longitudinal movement therein, said sliding frame having first and second ends;
   an eccentric actuating member;
   mounting means for rotatably mounting said eccentric actuating member on the first end of said housing member in operative engagement with the first end of said sliding frame so that rotation of said eccentric actuating member results in longitudinal movement of said sliding frame;
   said second end of said housing member having a channel located therein, oriented so as to receive a sheathed electrical conductor therein;
   conductor supporting means on one of said second ends for positioning a peripheral portion of a sheathed conductor received within said channel and;
   cooperating sheath cutting means on the other of said second ends for cutting into the sheath of a sheathed conductor positioned on said conductor supporting means upon longitudinal movement of said sliding frame, in response to the rotation of said eccentric actuating member, from a position most remote from said channel to an operative position wherein the conductor supporting means and cooperating sheath cutting means on said second ends are brought into operative engagement with a sheathed conductor received in said channel so as to enable the sheath of the sheathed conductor to be initially incised to a selected depth and subsequently completely cut in response to a rotational movement of said housing member about the sheathed conductor with said conductor supporting means and said cooperating sheath cutting means in operative engagement therewith;
   said most remote position of said sliding frame providing clearance between said second end of said sliding frame and an inserted conductor of the largest diameter receivable in said channel.

6. A stripping tool as in claim 4, wherein:
   said cutting means comprises an exchangeable knife cassette and includes at least one elongated cutting blade, said blade being arranged transversally with respect to the direction of orientation of a conductor inserted in said channel.

7. A stripping tool as in claim 6, wherein:
   said channel further comprises a knife cassette holder mounted for pivotal movement with respect to said second end of said housing member between an operative position and a cassette exchange position, and a stop member attached to said second end of said housing member for fixing said knife cassette holder in said operative position.

8. A stripping tool for insulated electrical conductors with circular cross-sections which are covered with at least one layer of insulation, comprising:
   a housing in which is accommodated at least one cutting means defined by a first interchangeable knife cassette which has at least two spaced apart settable cutting blades contained therein and which first cassette is interchangeable with a second knife cassette also having at least two settable cutting blades, wherein at least one cutting blade in said second cassette is spaced at a different spacing from the other cutting blade contained therein as compared with the spacing of the cutting blades of the first knife cassette;
   means for accommodating an insulated conductor, and means for pressing said conductor against said cutting means so that when the housing is rotated relative to the inserted conductor, initially only local incisions made by said cutting means are extended around the entire periphery of the conductor,
   each cutting blade being served by an operatively located blade setting screw, said setting screws being mounted in an insert which is exchangeable at the same time as the respective cassette.

9. The tool of claim 4, wherein for sets comprising two cutting blades spaced one from another 4,2 mm, two cutting blades spaced one from another 12 mm, three cutting blades spaced one 3 mm and 8 mm respectively, and three cutting blades spaced one from another 4 mm and 7,5 mm respectively, four setting screws are provided at spacements of 3,8 mm, 3,7 mm and 4,5 mm respectively one form another reckoned from a first setting screw, the cutting blades having a thickness of 0,3 to 0,5 mm, and at least the second and the fourth setting screw, reckoned from said first setting screw, have a diameter of 3,3-3,6 mm, a first cutting blade being in all sets disposed at the same location relative to the housing and to the said first setting screw.

10. The tool of claim 5, wherein the slider is by a resilient member constantly pressed against the cam member.

11. The tool of claim 1, wherein said different sets of cutting blades are housed in interchangeable knife cassettes insettable in said housing.

12. A stripping tool as in claim 5, wherein:
said eccentric actuating member is provided with positioning means, said positioning means defining several rotational positions of said actuating member corresponding to selected longitudinal positions of said sliding frame.

13. A stripping tool as in claim 12, wherein:
said positioning means comprises recesses located along a surface of said actuating member so as to cooperate with an engagement member attached to said first end of said first sliding frame.

14. A stripping tool as in claim 13, wherein:
a recess defining the most remote position of the sliding frame is deeper than the other recesses.

15. A stripping tool as in claim 5, further comprising:
eccentric member rotation limiting means mounted on said eccentric actuator for preventing rotation of said eccentric member from a selected rotational position.

16. A stripping tool as in claim 15, wherein:
said housing member has a settable lever attached to said first end, and said rotation limiting means comprises a plurality of settable lever engaging stop means positioned along a surface of said eccentric actuating member for engaging said settable lever and preventing rotation of said eccentric actuating member.

17. A stripping tool as in claim 16, wherein:
said settable lever engaging stop means comprises annular steps.

18. A stripping tool as in claim 16, wherein:
said settable lever engaging stop means comprises pins extending outwardly from a surface of said eccentric actuating member.

19. A stripping tool as in claim 4, wherein:
said sliding frame comprises a hollow body having mounted therein a block and spring means for resiliently urging said block towards said second end of said sliding frames.

20. The tool of claim 8 wherein the insert has a cross-sectional shape which is wider at the end adjacent the cassette than at the opposite end.

* * * * *